(12) United States Patent
Meissner et al.

(10) Patent No.: US 7,159,648 B2
(45) Date of Patent: Jan. 9, 2007

(54) WEATHER PROTECTED HEAT EXCHANGER

(75) Inventors: Alan P. Meissner, Franklin, WI (US); Gregory A. Mross, Franklin, WI (US); Robert L. Linstroth, Racine, WI (US); Jae An, Kenosha, WI (US)

(73) Assignee: Modine Manufacturing Company, Racine, WI (US)

( * ) Notice: Subject to any disclaimer, the term of this patent is extended or adjusted under 35 U.S.C. 154(b) by 429 days.

(21) Appl. No.: 10/830,901

(22) Filed: Apr. 23, 2004

(65) Prior Publication Data

US 2005/0247440 A1 Nov. 10, 2005

(51) Int. Cl.
*F28D 1/04* (2006.01)
(52) U.S. Cl. .................................. 165/148; 165/153
(58) Field of Classification Search ................ 165/148, 165/150–153
See application file for complete search history.

(56) References Cited

U.S. PATENT DOCUMENTS

| 6,202,741 B1* | 3/2001 | Demuth et al. ............. 165/176 |
| 6,904,965 B1* | 6/2005 | Beck et al. ................. 165/175 |
| 2003/0192682 A1* | 10/2003 | Lowenstein et al. ........ 165/153 |

* cited by examiner

*Primary Examiner*—Teresa J. Walberg
(74) *Attorney, Agent, or Firm*—Wood, Phillips, Katz, Clark & Mortimer

(57) ABSTRACT

A heat exchanger including upper and lower header tanks, a vertical baffle in the lower header tank defining first and second longitudinal chambers, a check valve, two tube rows, and a coolant inlet to the first chamber and outlet from the second chamber. The baffle includes a by-pass hole therethrough. One tube row includes a plurality of vertical tubes extending between the upper header tank and the first chamber of the lower header tank, and the other tube row includes a plurality of vertical tubes extending between the upper header tank and the second chamber of the lower header tank. The check valve creates a leak-proof seal during standard operating mode to prevent pressure release from the header tank and creates an air path between the header tank and the environment during draining mode to allow vacuum relief from the header tank.

31 Claims, 3 Drawing Sheets

WEATHER PROTECTED HEAT EXCHANGER

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward heat exchangers, and particularly toward a compact, weather protected radiator.

BACKGROUND OF THE INVENTION AND TECHNICAL PROBLEMS POSED BY THE PRIOR ART

Heat exchangers are, of course, widely used in a variety of different applications. Radiators are, for example, used to discharge heat from a coolant fluid to environmental air, where the fluid is circulated between a heat generating device and the heat discharging radiator. An automobile radiator is a well known example, in which coolant flows through the automobile engine to pick up heat generated by operation of the engine, with the heated coolant then flowing through the radiator (where it is cooled by exchanging heat with [i.e., discharging heat to] environmental air passing over the outer surfaces of the radiator) and then back to the engine (where the cooled coolant again picks up heat from the engine).

In many such applications, including automotive applications, fluid used as a coolant may be subject not only to hot temperatures, but also to extreme cold temperatures. Thus, for example, coolant used in an automobile engine compartment will not only be subjected to the heat generated by the component which it cools but may also be subjected to the cold temperatures of winter weather. Since freezing of the coolant fluid in such conditions could have catastrophic effects, including particularly the possibility of damage to components due to expansion of the frozen fluid in a restricted space (like a soda bottle left in a freezer), coolant fluids are often used which are specially formulated so as to not freeze in the range of environmental temperatures expected to be encountered.

Of course, such specially formulated coolant fluids can be costly. Moreover, fluids formulated to not freeze at certain temperatures may also have other corrosive and other characteristics which may make them unsuitable for certain applications. For example, in some fuel cells, such as proton exchange membrane (PEM) fuel cells, deionized (DI) water is preferably used for cooling. However, such water in many environments is likely to encounter temperatures which would cause the water to freeze.

The present invention is directed toward overcoming one or more of the problems set forth above.

SUMMARY OF THE INVENTION

In one aspect of the present invention, a heat exchanger is provided for cooling fluid from a fuel cell, including longitudinal upper and lower header tanks with a longitudinal baffle in the lower header tank defining first and second longitudinal chambers. The baffle includes a by-pass hole allowing restricted flow of fluid therethrough. A vacuum break valve is between the upper header tank and the environment, with the valve serving dual purposes: 1) to create a leak-proof seal during standard operating mode, preventing pressure release from the header tank and 2) to create an air path between the header tank and the environment during draining mode, allowing vacuum relief from the header tank. A first tube row is defined by a first plurality of parallel vertical tubes and extends between the upper header tank and the first longitudinal chamber of the lower header tank, and a second tube row is defined by a second plurality of parallel vertical tubes and extends between the upper header tank and the second longitudinal chamber of the lower header tank. A cooling fluid inlet communicates with the first chamber; and a cooling fluid outlet communicates with the second chamber.

In one form of this aspect of the invention, the vacuum break valve prevents pressure in the heat exchanger from dropping substantially below pressure in the surrounding environment.

In another form of this aspect of the invention, the by-pass hole is sized to minimize heat transfer impact during operation and allow fluid drainage therethrough when shut down.

In another form of this aspect of the invention, fins are provided between the plurality of vertical tubes. In further forms, the fins may be louvered and/or serpentine.

In yet another form of this aspect of the invention, one of the inlet and outlet comprises a tube extending through the baffle from the chamber with which it communicates and through the other chamber. In a still further form, the one of the inlet and outlet is the outlet extending through the first chamber.

In still another form of this aspect of the invention, the fluid is deionized water.

In still another form of this aspect of the invention, when fluid does not flow into the inlet, fluid in the first tube row drains toward the lower header tank.

In a still further form of this aspect of the invention, the vacuum break valve is a check valve preventing the release of pressure from the heat exchanger to the environment.

In another aspect of the invention, a heat exchanger is provided including an upper header tank and a lower header tank, a generally vertical baffle in the lower header tank defining first and second longitudinal chambers in the lower header tank, a check valve, two tube rows, a cooling fluid inlet to the first chamber, and a cooling fluid outlet from the second chamber. The baffle includes a by-pass hole therethrough. A first one of the tube rows is defined by a first plurality of parallel generally vertical tubes extending between the upper header tank and the first longitudinal chamber of the lower header tank. The second tube row is defined by a second plurality of parallel generally vertical tubes extending between the upper header tank and the second longitudinal chamber of the lower header tank. The check valve serves dual purposes: 1) to create a leak-proof seal during standard operating mode, preventing pressure release from the header tank and 2) to create an air path between the header tank and the environment during draining mode, allowing vacuum relief from the header tank.

In one form of this aspect of the present invention, the check valve prevents pressure in the heat exchanger from dropping substantially below pressure in the surrounding environment In another form of this aspect of the invention, the by-pass hole is sized to minimize heat transfer impact during operation and allow fluid drainage therethrough when shut down.

In another form of this aspect of the invention, fins are provided between the plurality of vertical tubes. In further forms, the fins may be louvered and/or serpentine.

In yet another form of this aspect of the invention, the outlet comprises a tube extending through the baffle from second chamber through the first chamber.

In still another form of this aspect of the invention, the fluid is deionized water.

In still another aspect of the invention, a heat exchanger for cooling fluid from a fuel cell is provided, including upper and lower header tanks with a baffle in the lower header tank defining first and second chambers. The baffle includes a by-pass hole allowing restricted flow of fluid therethrough. A vacuum break valve is between the upper header tank and the environment, with the valve serving dual purposes: 1) to create a leak-proof seal during standard operating mode, preventing pressure release from the header tank and 2) to create an air path between the header tank and the environment during draining mode, allowing vacuum relief from the header tank. A first group of tubes is defined by a first plurality of parallel vertical tubes and extends between the upper header tank and the first chamber of the lower header tank, and a second tube row is defined by a second plurality of parallel vertical tubes and extends between the upper header tank and the second chamber of the lower header tank. A cooling fluid inlet communicates with the first chamber; and a cooling fluid outlet communicates with the second chamber.

In one form of this aspect of the invention, the vacuum break valve prevents pressure in the upper header tank from dropping substantially below pressure in the surrounding environment.

In another form of this aspect of the invention, the by-pass hole is sized to minimize heat transfer impact during operation and allow fluid drainage therethrough when shut down.

In another form of this aspect of the invention, the baffle is a vertical longitudinal wall separating the lower header tank into the first and second chambers, the first and second chambers are longitudinal, and one of the inlet and outlet is a tube extending through the baffle from the chamber with which it communicates and through the other chamber. In a further form, the first group of tubes is a front tube row and the second group of tubes is a rear tube row.

In still another form of this aspect of the invention, the baffle is a vertical front to back wall separating the lower header tank into the first and second chambers, and said first group of tubes is a first plurality of tubes on one side of the wall and the second group of tubes is a second plurality of tubes on the other side of the wall.

In another form of this aspect of the invention, fins are provided between the plurality of vertical tubes. In further forms, the fins may be louvered and/or serpentine.

In still another form of this aspect of the invention, the fluid is deionized water.

In still another form of this aspect of the invention, when fluid does not flow into the inlet, fluid in the first tube row drains toward the lower header tank.

In a still further form of this aspect of the invention, the vacuum break valve is a check valve preventing the release of pressure from the heat exchanger to the environment.

DETAILED DESCRIPTION OF THE INVENTION

Figure 1:
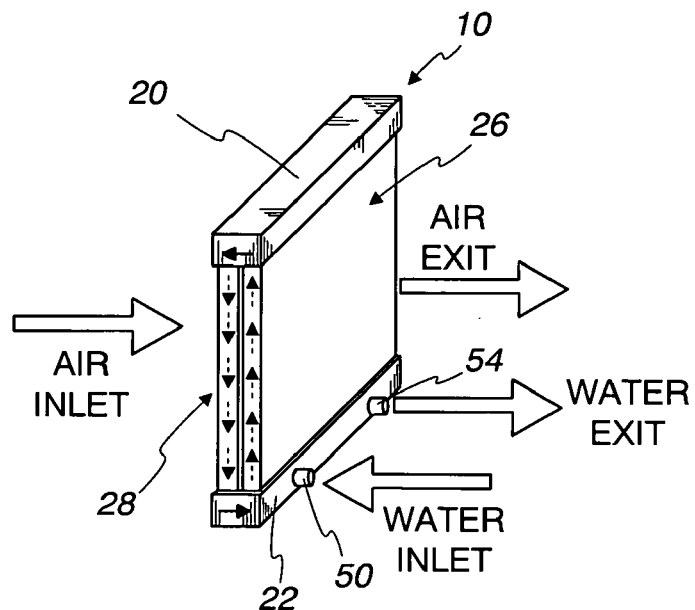
FIG. 1 is a simplified perspective view of a heat exchanger according to the present invention.

A heat exchanger 10 according to the present invention is illustrated in FIG. 1.

The heat exchanger 10 includes a longitudinally extending, generally horizontal upper header tank assembly (herein "header tank") 20 and a longitudinally extending, generally horizontal lower header tank assembly ("header tank") 22. A pair of tube rows 26, 28 extend between the header tanks 20, 22.

Figure 3:
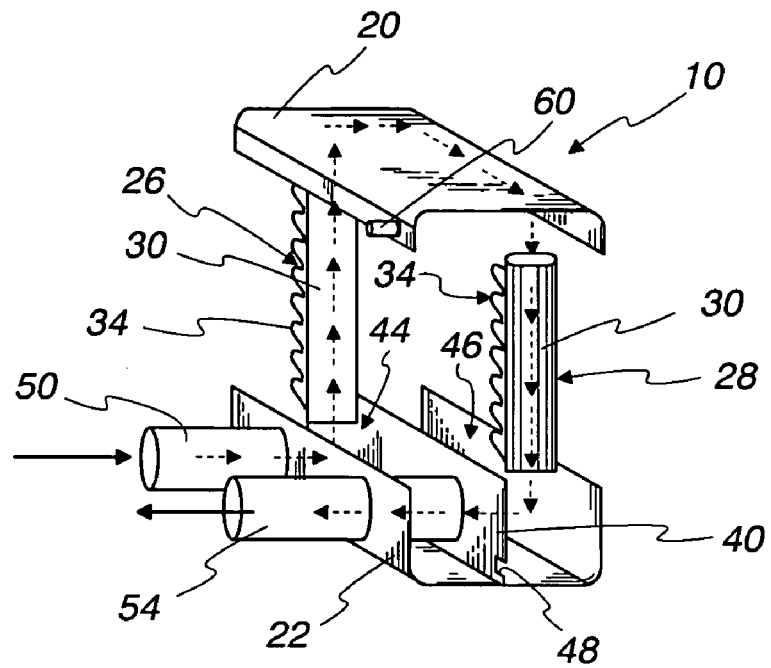
FIG. 3 is a perspective view of the FIG. 1 heat exchanger, with parts omitted for illustration purposes, illustrating coolant flow during operation.
Figure 4:
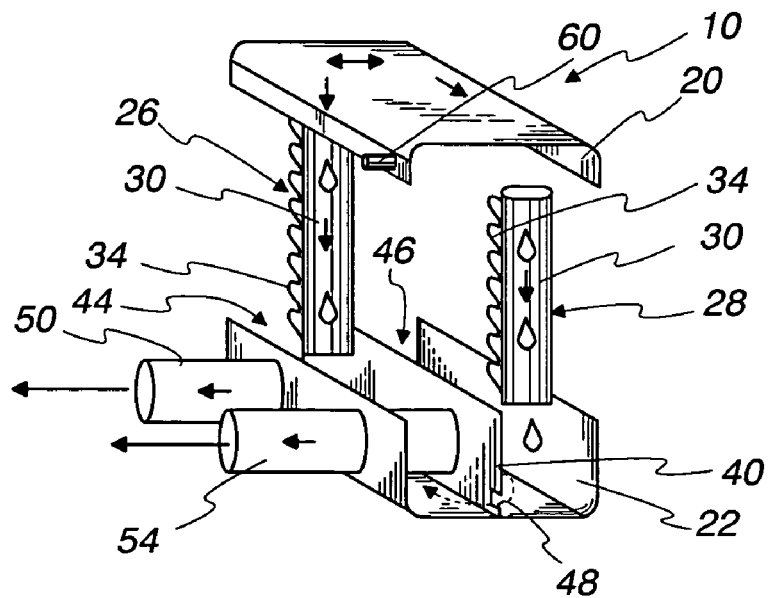
FIG. 4 is a perspective view of the FIG. 1 heat exchanger, with parts omitted for illustration purposes, illustrating coolant flow during draining when assuming freeze protection mode.

Each tube row 26, 28 consists of a plurality of parallel, generally vertical tubes 30 with suitable cooling fins 34 therebetween as illustrated in FIGS. 3–4 (where only a single tube 30 and serpentine fin 34 is shown for each row 26, 28).

As shown in FIG. 1, air flow may advantageously be directed through the air side of the heat exchanger 10, with air entering the heat exchanger 10 through the tube row 28 providing the coolant second pass, and air exiting the heat exchanger 10 through the tube row 26 providing the coolant first pass (as described further hereafter).

The tubes 30 may advantageously include dimples on the coolant (inner) side, as such dimples may advantageously improve heat transfer at high heat duties, where it is particularly desirable to minimize parasitic losses from auxiliary pumps and to generate low coolant-side mass flow (laminar) rates. However, it should be understood that still other tube designs could be used within the scope of the present invention.

The fins 34 may advantageously be high-density louvered, serpentine fins, as such fins may advantageously direct high air side flow rates as may be required at high heat duties. However, it should be understood that still other fins, including plate fins, could be used within the scope of the present invention.

A longitudinally extending vertical baffle 40 is provided in the lower header tank 22 (see FIGS. 3–4) to define separate longitudinal chambers 44, 46 in the lower header tank 22. A by-pass hole 48 is provided in the baffle 40 to allow restricted flow of coolant between the chambers 44, 46 as further described hereafter.

A suitable coolant inlet 50 communicates with one of the lower header tank chambers 44, and a suitable coolant outlet 54 communicates with the other lower header tank chamber 46. As seen in FIGS. 3–4, the outlet 54 may extend through the one chamber 46 to allow the inlet 50 and outlet 54 to be conveniently disposed on the same side of the heat exchanger 10. It should be appreciated, however, that it would be within the scope of the present invention to provide the inlet and outlet on the other side of the heat exchanger, or to provide them on opposite sides of the heat exchanger.

A suitable vacuum break valve 60 is provided in the upper header tank 20 to serve dual purposes: 1) create a leak-proof seal during standard operating mode, preventing pressure release from the header tank and 2) create an air path between the header tank and the environment during draining mode, whereby any vacuum which might form in the upper header tank 20 during draining will be relieved.

For example, the valve 60 may permit environmental (air side) pressure to vent into the upper header tank 20 when the environmental pressure is greater than the pressure inside the upper header tank 20, with the valve 60 advantageously functioning like a check valve which prevents the release of pressure from the header tank 20. Thus, during normal operation, the valve 60 will be closed. However, when pressure drops inside the heat exchanger 10 such as may occur when coolant is not flowing through the heat exchanger 10 (e.g., the heat exchanger 10 is not operating), the valve 60 may open to allow air to vent into the upper header tank 20.

Figure 2:
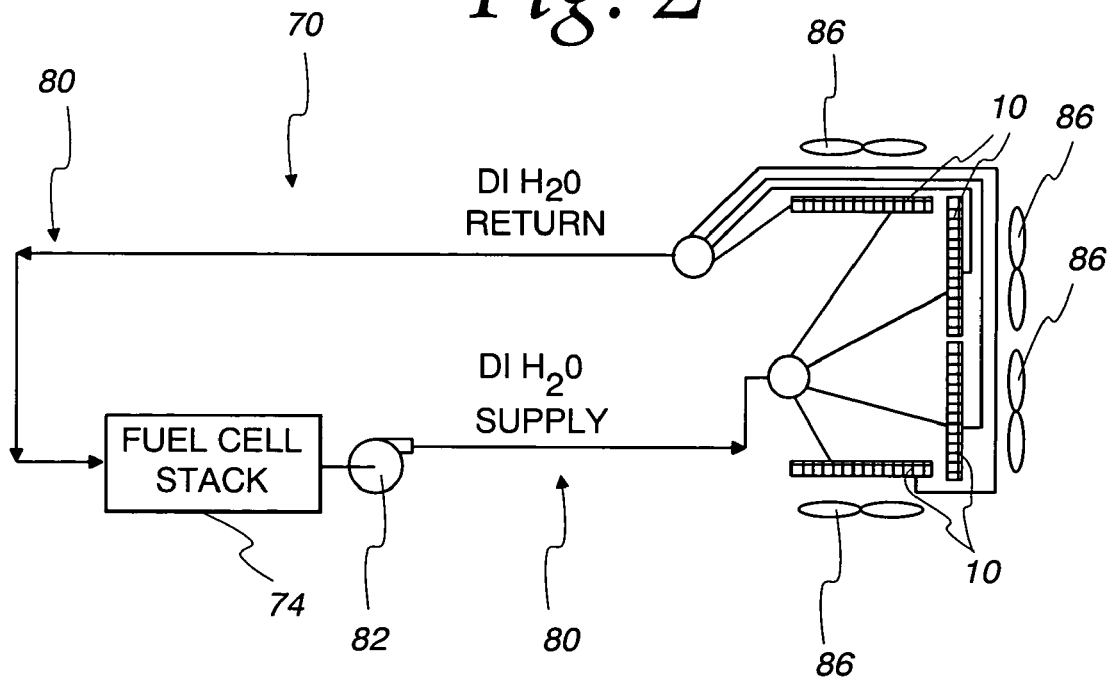
FIG. 2 is a schematic view of one system with which heat exchangers according to the present invention may be advantageously used.

FIG. 2 illustrates an example of a system in which heat exchangers 10 according to the present invention may be used. Specifically, the illustrated system 70 includes proton exchange membrane (PEM) fuel cells 74 and a circuit 80 through which deionized (DI) water is circulated for cooling of the fuel cells 74 which can generate significant amounts of heat during use.

A pump 82 circulates the water to the inlets 50 of the heat exchangers 10 (four of which are shown schematically in FIG. 2), and the water is then cooled in the heat exchangers 10, after which it passes out the heat exchanger outlets 54 and then to the fuel cells 74 via the return portion of the circuit 80.

Air is suitably passed through the air side of the heat exchangers 10 such as is understood by those skilled in the art. Fans 86 (see FIG. 2) may be provided to force air over the air side of the heat exchanger 10, whereby heat from the water which is transferred to the walls of the tubes 30 and to the fins 34 is transferred to the air. Ram air resulting from, for example, movement of a vehicle can also be used within the scope of the invention.

Flow of the coolant (such as DI water) through the heat exchanger 10 is illustrated in FIGS. 1 and 3–4. Specifically, the coolant enters the heat exchanger 10 through the inlet 50 from which it is distributed through the one lower header tank chamber 44 to the tubes 30 of the first tube row 26. The coolant then travels up through the tubes 30 of the first tube row 26 (see FIGS. 1 and 3) to the upper header tank 20. The coolant then passes through the upper header tank 20 to the tubes 30 of the second tube row 28, and then passes down those tubes 30, discharging into the other lower header tank chamber 46, from which it is discharged through the outlet 54.

It should be appreciated that the above described heat exchanger 10 provides a compact, multipass (e.g., two-pass) design which allows the heat exchanger 10 to be readily used in restricted spaces while still meeting high heat transfer requirements. In fact, heat exchangers 10 according to the present invention have been tested and have been found to meet the advantageous results of predictive models as indicated in Table 1 below.

TABLE 1

HEAT TRANSFER AND AIR SIDE PRESSURE DROP TESTS

| | | AIR | | | | | WATER | | | | |
|---|---|---|---|---|---|---|---|---|---|---|---|
| | | Inlet temp ° F. | Exit temp ° F. | Q SCFM | del P in WC | q dot Btu/min | Inlet temp ° F. | Exit temp ° F. | m dot $Ib_m$/min | delta P in WC | q dot Btu/min |
| Run 1 | Predicted/ Target | 75 | 145.52 | 3300 | 0.35 | 4190 | 160 | 117.72 | 99.14 | 18.75 | 4190 |
| | Actual | 72.25 | 142.4 | 3300 | 0.295 | 4184 | 160 | 117.1 | 99.49 | | 4260 |
| Run 2 | Predicted/ Target | 75 | 138.57 | 4300 | 0.48 | 4919 | 160 | 110.35 | 99.14 | 19.16 | 4919 |
| | Actual | 71.96 | 135.2 | 4302 | 0.418 | 4919 | 160 | 110.1 | 99.43 | | 4940 |
| Run 3 | Predicted/ Target | 75 | 132.27 | 5300 | 0.61 | 5461 | 160 | 104.86 | 99.14 | 19.52 | 5461 |
| | Actual | 72.29 | 127.8 | 5300 | 0.58 | 5310 | 160 | 104.5 | 99.53 | | 5499 |

When the system with which the heat exchanger 10 is use is not in operation, the heat exchanger 10 will readily and safely assume a freeze protection mode by draining as illustrated in FIG. 4. That is, with no more coolant being pumped into the heat exchanger 10, the coolant will drain as a result of gravity, with any coolant in the upper header tank 20 and the tubes 30 in both tube rows 26, 28 flowing down the tubes 30 to the lower header tank 22. Moreover, the valve 60 will prevent a low pressure or vacuum from forming in the space in the upper header tank 20 and the upper ends of the tubes 30 from which the coolant drains. Thus, the draining of the coolant from the heat exchanger 10 will be unhindered so as to occur fully and quickly, and further allowing the draining coolant to flow as necessary through the baffle by-pass hole 48 to equalize fluid between the tube rows 26, 28 and lower header tank chambers 44, 46. Accordingly, draining on both sides of the circuit 80 may be equalized and (particularly in those systems in which some coolant will remain in the heat exchanger 10 even when not operating) will be advantageously equalized on both sides (i.e., between the first tube row 26 and first chamber 44 and the second tube row 28 and the second chamber 46). This provides a freeze protection mode by serving to mitigate the formation of ice when environmental conditions might otherwise threaten the functionality of the unit.

It should be appreciated that the by-pass hole 48 may be advantageously sized, depending upon the design considerations of the heat exchanger 10 (such as operating pressures and temperatures, and fluids characteristics), to minimize heat transfer impact during operation (i.e., to minimize fluid flow through the by-pass hole 48 during operation) while also allowing suitable fluid drainage therethrough for the freeze protection mode as desired when shut down.

Figure 5:
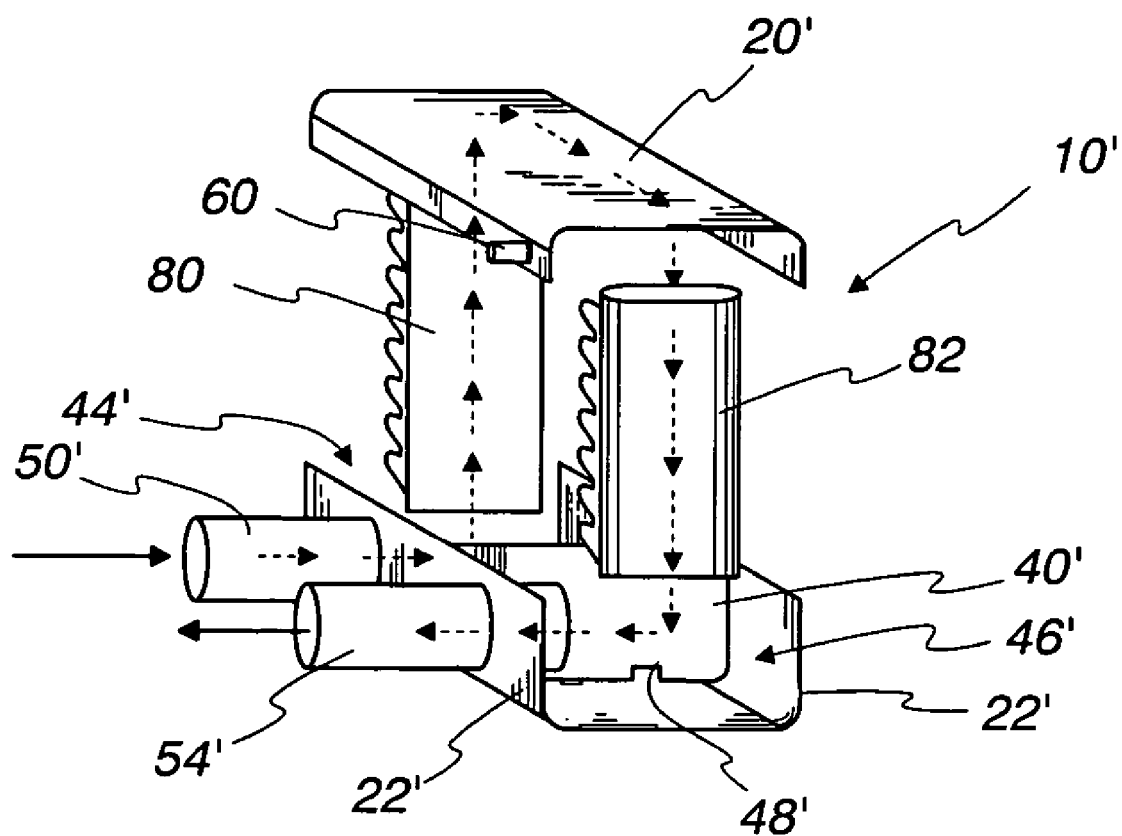
FIG. 5 is a perspective view of an alternative embodiment of a heat exchanger according to the present invention, with parts omitted for illustration purposes, illustrating coolant flow during operation.

FIG. 5 shows an alternate embodiment of the invention, with components such as in the FIG. 1 embodiment given the same reference numerals as in FIG. 1, and similar but modified components given the same reference numerals plus prime ("'"; e.g., baffle 40'). Specifically, a baffle 40' extends from the front and back walls of the lower header tank 22' to define separate side-by-side chambers 44', 46' in the lower header tank 22'. A by-pass hole 48' is provided in the baffle 40' to allow restricted flow of coolant between the chambers 44', 46' (i.e., during the freeze protection mode such as described with the first embodiment).

In the FIG. 5 embodiment, a single tube row may be provided, with fluid flowing upwardly from the first chamber 44' through one group of tubes 80 on one side of the heat exchanger 10', such fluid then passing longitudinally through the upper header tank 20' (as opposed to the front to back flow in the FIG. 1 embodiment) to the second group of tubes 82, discharging into the second chamber 46' on the other side of the heat exchanger 10'.

It should be appreciated that combinations of the above embodiments could also be used within the scope of the present invention. For example, multiple tube rows could be used with the baffle 40' of FIG. 5, with flow from one pass to the next occurring longitudinally along the upper header tank 20'. Further, a heat exchanger according to the present invention could be provided with various combinations of longitudinal and/or front to back baffles to operate with more than two passes.

It should also be appreciated that heat exchangers according to the present invention may be advantageously manufactured and maintained as well. That is, the design readily accommodates flushing to reduce the existence of CAB flux residue, and thereby reduce or eliminate the electrochemical potential of DI water which could be detrimental to the ion exchange desired within the fuel cells 74.

It should thus be appreciated that heat exchangers according to the present invention may be advantageously used to provide significant heat transfer in compact spaces. Moreover, such heat exchangers may be readily used in extreme weather conditions.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A heat exchanger for cooling fluid from a fuel cell, comprising:
    a longitudinal upper header tank;
    a longitudinal lower header tank;
    a longitudinal baffle in said lower header tank defining first and second longitudinal chambers, said baffle including a by-pass hole allowing restricted flow of fluid therethrough;
    a vacuum break valve between said upper header tank and the environment, said valve blocking pressure release from the upper header tank during operation and allowing an air path between the upper header tank and the environment during draining;
    a first tube row defined by a first plurality of parallel vertical tubes extending between said upper header tank and said first longitudinal chamber of said lower header tank;
    a second tube row defined by a second plurality of parallel vertical tubes extending between said upper header tank and said second longitudinal chamber of said lower header tank;
    a cooling fluid inlet communicating with said first chamber; and
    a cooling fluid outlet communicating with said second chamber.

2. The heat exchanger of claim 1, wherein said vacuum break valve prevents pressure in the heat exchanger from dropping substantially below pressure in the surrounding environment.

3. The heat exchanger of claim 1, wherein said by-pass hole is sized to minimize heat transfer impact during operation and allow fluid drainage therethrough when shut down.

4. The heat exchanger of claim 1, further comprising fins between said plurality of vertical tubes.

5. The heat exchanger of claim 4, wherein said fins are louvered.

6. The heat exchanger of claim 4, wherein said fins are serpentine.

7. The heat exchanger of claim 1, wherein one of said inlet and outlet comprises a tube extending through the baffle from the chamber with which it communicates and through the other chamber.

8. The heat exchanger of claim 7, wherein said one of said inlet and outlet is said outlet extending through the first chamber.

9. The heat exchanger of claim 1, wherein said fluid is deionized water.

10. The heat exchanger of claim 1, wherein when fluid does not flow into said inlet, fluid in said first tube row drains toward said lower header tank.

11. The heat exchanger of claim 1, wherein said vacuum break valve is a check valve preventing the release of pressure from the heat exchanger to the environment.

12. A heat exchanger, comprising:
    an upper header tank and a lower header tank, said upper and lower header tanks having a generally horizontal longitudinal dimension;
    a generally vertical baffle in said lower header tank defining first and second longitudinal chambers in said lower header tank, said baffle including a by-pass hole therethrough;
    a check valve blocking pressure release from the upper header tank during operation and allowing an air path between the upper header tank and the environment during draining;
    a first tube row defined by a first plurality of parallel generally vertical tubes extending between said upper header tank and said first chamber of said lower header tank;
    a second tube row defined by a second plurality of parallel generally vertical tubes extending between said upper header tank and said second chamber of said lower header tank;
    a cooling fluid inlet to said first chamber; and
    a cooling fluid outlet from said second chamber.

13. The heat exchanger of claim 12, wherein said check valve prevents pressure in the heat exchanger from dropping substantially below pressure in the surrounding environment.

14. The heat exchanger of claim 12, wherein said by-pass hole is sized to minimize heat transfer impact during operation and allow fluid drainage therethrough when shut down.

15. The heat exchanger of claim 12, further comprising fins between said plurality of vertical tubes.

16. The heat exchanger of claim 15, wherein said fins are louvered.

17. The heat exchanger of claim 15, wherein said fins are serpentine.

18. The heat exchanger of claim 12, wherein said outlet comprises a tube extending through the baffle from second chamber through the first chamber.

19. The heat exchanger of claim 12, wherein said fluid is deionized water.

20. A heat exchanger for cooling fluid from a fuel cell, comprising:
   an upper header tank;
   a lower header tank;
   a baffle in said lower header tank defining first and second chambers, said baffle including a by-pass hole allowing restricted flow of fluid therethrough;
   a vacuum break valve between said upper header tank and the environment, said valve blocking pressure release from the upper header tank during operation and allowing an air path between the upper header tank and the environment during draining;
   a first group of tubes defined by a first plurality of parallel vertical tubes extending between said upper header tank and said first longitudinal chamber of said lower header tank;
   a second group of tubes defined by a second plurality of parallel vertical tubes extending between said upper header tank and said second longitudinal chamber of said lower header tank;
   a cooling fluid inlet communicating with said first chamber; and
   a cooling fluid outlet communicating with said second chamber.

21. The heat exchanger of claim 20, wherein said vacuum break valve prevents pressure in the upper header tank from dropping substantially below pressure in the surrounding environment.

22. The heat exchanger of claim 20, wherein said by-pass hole is sized to minimize heat transfer impact during operation and allow fluid drainage therethrough when shut down.

23. The heat exchanger of claim 20, wherein said baffle comprises a vertical longitudinal wall separating said lower header tank into said first and second chambers, said first and second chambers being longitudinal and one of said inlet and outlet comprising a tube extending through the baffle from the chamber with which it communicates and through the other chamber.

24. The heat exchanger of claim 23, wherein said first group of tubes comprises a front tube row and said second group of tubes comprises a rear tube row.

25. The heat exchanger of claim 20, wherein said baffle comprises a vertical front to back wall separating said lower header tank into said first and second chambers, and said first group of tubes comprises a first plurality of tubes on one side of said wall and said second group of tubes comprises a second plurality of tubes on the other side of said wall.

26. The heat exchanger of claim 20, further comprising fins between said plurality of vertical tubes.

27. The heat exchanger of claim 26, wherein said fins are louvered.

28. The heat exchanger of claim 26, wherein said fins are serpentine.

29. The heat exchanger of claim 20, wherein said fluid is deionized water.

30. The heat exchanger of claim 20, wherein when fluid does not flow into said inlet, fluid in said first tube row drains toward said lower header tank.

31. The heat exchanger of claim 20, wherein said vacuum break valve is a check valve preventing the release of pressure from the heat exchanger to the environment.

* * * * *